Oct. 11, 1932.  A. LEVEDAHL  1,881,728
CLUTCH DEVICE
Original Filed Oct. 6, 1927   3 Sheets-Sheet 3

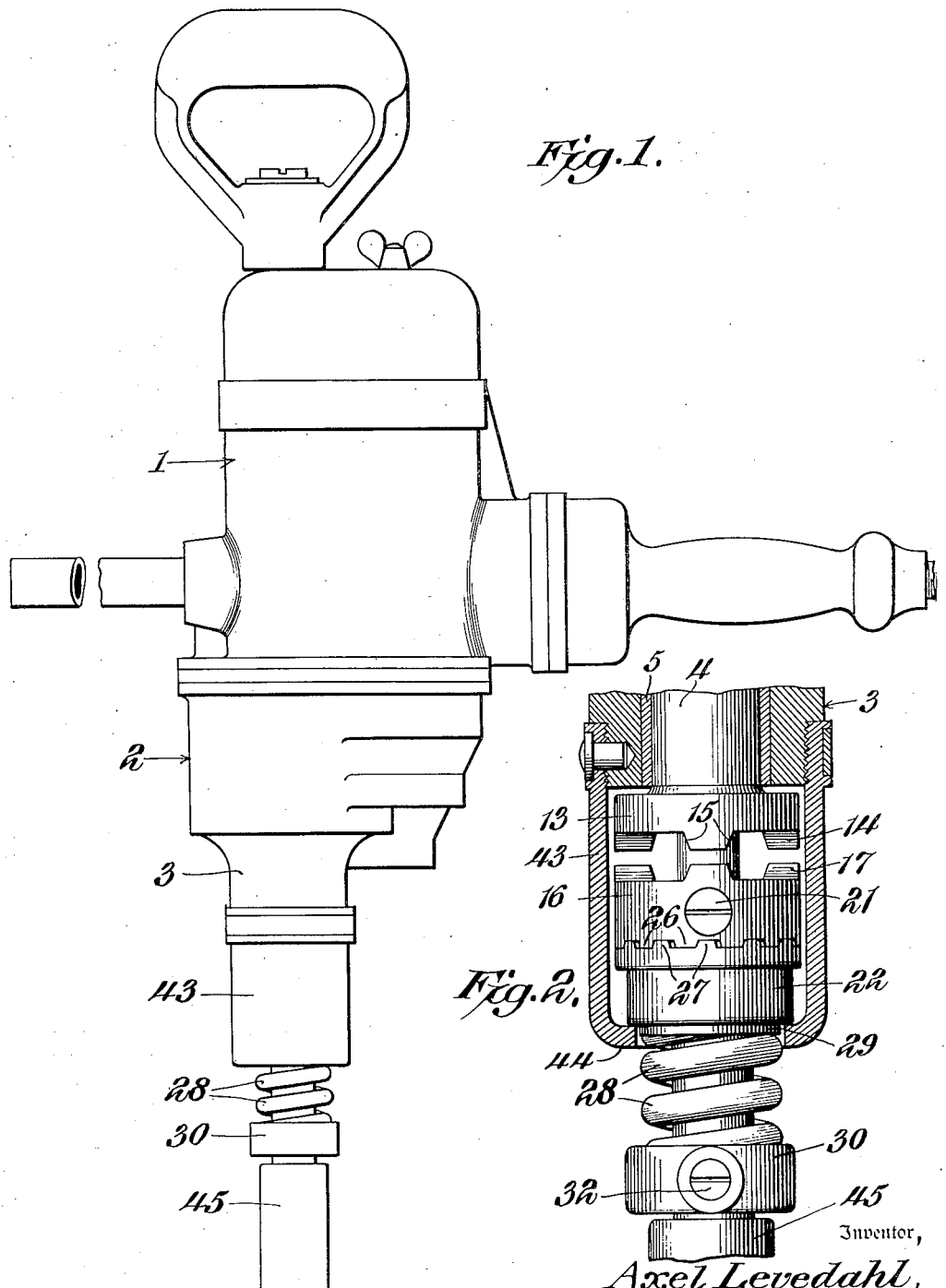

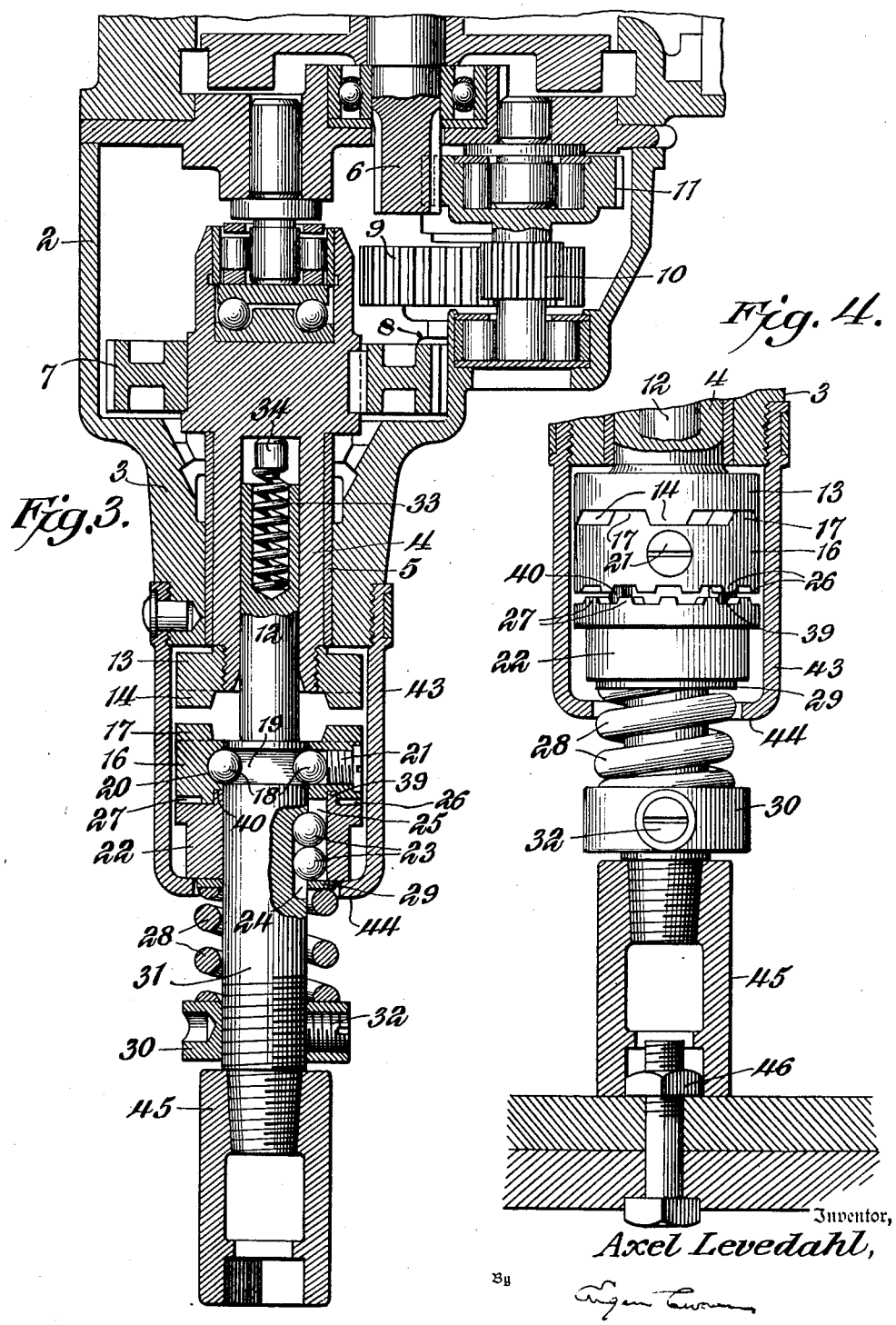

Axel Levedahl, Inventor,
By
Attorney

Patented Oct. 11, 1932

1,881,728

UNITED STATES PATENT OFFICE

AXEL LEVEDAHL, OF AURORA, ILLINOIS, ASSIGNOR TO INDEPENDENT PNEUMATIC TOOL COMPANY, OF CHICAGO, ILLINOIS, A CORPORATION OF DELAWARE

CLUTCH DEVICE

Original application filed October 6, 1927, Serial No. 224,372. Divided and this application filed October 28, 1929. Serial No. 402,913.

My invention relates to improvements in clutches generally, although more specifically to a clutch mechanism which is particularly adapted for use in portable power driven tools, such as are employed for rotating screws or nuts.

This application is a division of my copending application, Serial No. 224,372, filed Oct. 6, 1927, now issued as Patent No. 1,744,976, granted January 28, 1930, for improvements in screw or nut driving devices for power operated tools.

This application covers the clutch assembly and its various parts or elements alone as well as in combination with each other, without reference to the clutch broadly in its combination in the tool as claimed in the parent application (the patent aforesaid).

One object of my invention with respect to the clutch mechanism is to provide a clutch device, including a pair of axially aligned clutch members provided with a multiplicity of interchangeable clutch teeth on their opposed faces, and with the clutch members so constructed that their teeth engage in a single rotative position only of the clutch members, and which members are operable upon the development of a predetermined torsional stress between them to automatically separate the members and hold their teeth out of positive driving engagement for substantially a full revolution of one clutch member with respect to the other.

Another object of my invention with respect to this clutch mechanism is to provide the clutch members with co-acting means for the automatic separation of the clutch members and to hold them out of positive driving engagement for substantially a full revolution of one member with respect to the other.

A further object of the invention with respect to said clutch mechanism is to provide the co-acting means on the respective clutch members in the form of interfitting grooves and projections adapted, when the projections are in the grooves, to permit the teeth of the clutch members to engage, and when the projections ride out of the grooves to separate said teeth to release the clutch members.

A further object of the invention is to arrange the grooves and projections in two concentric tracks of different radii with each track preferably having but one groove or one projection therein.

A further object of the invention is to have the projections on one clutch member extending outward therefrom a distance slightly greater than the height of the teeth of such clutch member, so as to completely separate the teeth of the clutch members when the projections are out of the grooves.

A further object of the invention is to incorporate in the clutch construction as heretofore described a third clutch member which is cooperable with one of the two clutch members in a manner to establish the main drive through the clutch assembly, which drive is released when the two clutch members are automatically disconnected through the operation of the releasing means associated with such clutch members.

The invention consists further in the matters hereinafter described and claimed.

In the accompanying drawings—

Fig. 1 shows a portable power driven tool equipped with the device of my invention;

Fig. 2 has the guard or sleeve for the clutches in vertical section to show the clutches;

Fig. 3 is an enlarged vertical sectional view through the device and associated parts of the tool;

Fig. 4 is a view similar to Fig. 2 and shows the main clutch closed and the supplemental clutch held open by the means of my invention;

Figure 5:
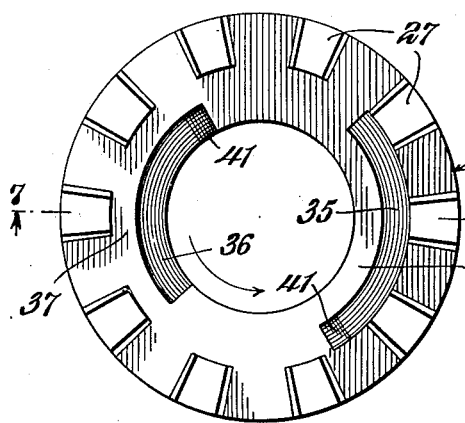
Figs. 5 and 6 are face views of the members of the supplemental clutch to show the clutch separating means of my invention.
Figure 6:
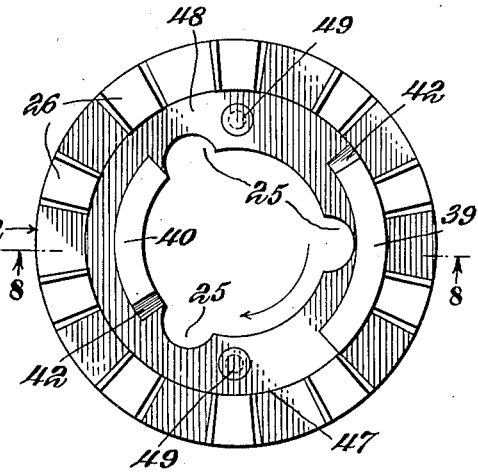
Figure 7:
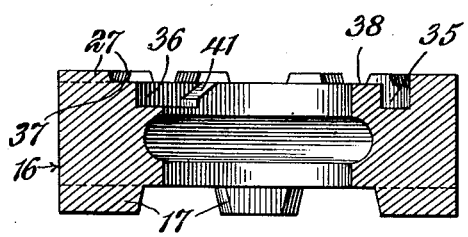
Figure 8:
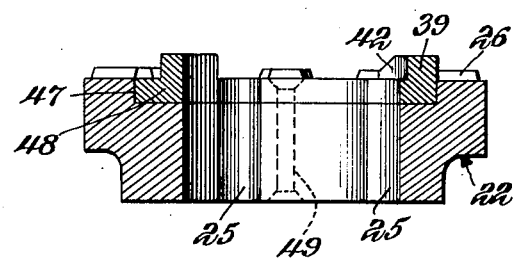
Figure 9:
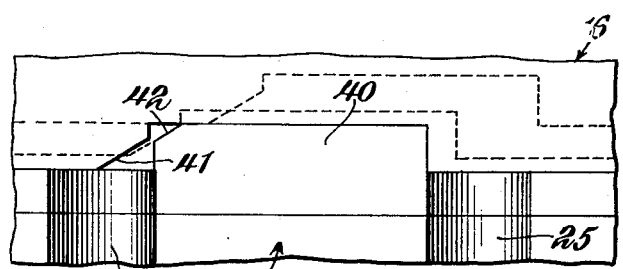

Figs. 7 and 8 are sectional views taken through these clutch members on lines 7—7 and 8—8, respectively, of Figs. 5 and 6; and Fig. 9 is a diagrammatic view showing the action of one of the projections of my device.

In the drawings, I have shown a clutch embodying my invention applied to a portable electric drill, which has connected motor and gear cases 1 and 2, with a tubular extension 3 on the forward end of the gear case and in which extension is journaled the rotary spindle 4 of the tool with a bearing bushing 5 about the spindle in the extension, as shown in Figs. 2 and 3. The spindle 4 is driven from the armature shaft 6 of the motor of the tool through a speed reducing gearing which is located in the case 2 and comprises a gear 7 fixed on the upper end of the spindle 4 and meshing with a pinion 8 carried by a gear 9. The latter meshes with a pinion 10 carried by a gear 11 which meshes with gear teeth on the armature shaft 6 where it extends into the case 2.

A shaft 12 has its inner end extending into and slidably and rotatably supported in the spindle 4, the latter being made hollow for the purpose. The outer end of the spindle 4 extends beyond the extension 3 and there is provided with an annular clutch member 13, which has on its outer face a plurality of jaws or clutch teeth 14 having inclined side faces 15, as shown in Figs. 2 and 4. The clutch member 13 is screwed or keyed on the outer end of the spindle 4 and turns with the spindle when the latter is rotated by the armature shaft 6 of the motor during the operation of the tool.

A similar clutch member 16 is located on the shaft 12 just beyond the clutch member 13 and has on its inner face a plurality of jaws or clutch teeth 17 made and arranged similar to the clutch teeth 14 and adapted to engage the same on pressing the tool against the work. (See Fig. 4.) The clutch member 16, is rotatably connected with the shaft 12 by means of a number of balls 18, 18 fitting half in each of circumferential grooves 19, 20 in the clutch member 16 and shaft 12, respectively, as shown in Fig. 3. A screw plug 21 normally closes the hole in the clutch member 16 through which the balls 18 are inserted into the grooves in assembling the parts.

A third clutch member 22, is splined or slidably mounted (within limits) on the shaft 12 beyond the clutch member 16. This slidable connection is made through the provision of three sets of ball keys 23, 23 located half in each of longitudinal grooves 24, 25 in the shaft 12 and clutch member 22, respectively. Each set of keys preferably comprises a pair of balls 23, and the three sets of balls and their grooves are spaced apart circumferentially about the clutch member 22, as shown in Fig. 6.

The opposed faces of the clutch members 16 and 22 have co-operating jaws or clutch teeth 26, 27, respectively. The teeth 26 are arranged to fit within the spaces between the teeth 27 and have their engaging side faces inclined so that they may slip to disengage the clutch members 16 and 22, when one member is turned with respect to the other in a manner to be presently described.

A relatively heavy coiled spring 28 surrounds the shaft 12 beyond the clutch member 22. This spring has its inner end against a washer 29 at the outer end of the clutch member 22, and has its outer end bearing against a nut 30 screwed on the threaded portion 31 of the shaft 12. By this construction, the nut may be adjusted along the shaft 12 to regulate the tension of the spring 28 and thus set the torque at which the teeth 26, 27 of the clutch members 16, 22 will disengage on the setting of a screw or nut. A set screw 32 carried by the nut is used to set the nut in its position of adjustment along the shaft. The washer 29 serves to close the outer ends of the grooves 25 so that the balls 23 can not work or drop out of the same. The inner ends of these grooves are closed by the clutch member 16, as shown in Fig. 3.

The clutch members 13 and 16 are normally held disengaged or apart by a coiled spring 33 fitted in a hollow at the upper or inner end of the shaft 12. The inner end of this spring carries a plug 34 which is forced by the spring against the inner end of the hollow in the spindle 4. The spring 33 urges the shaft 12 outward from the spindle 4 and thus normally maintains the clutch members 13, 16 disengaged or apart, while the spring 28 normally holds the clutch member 22 engaged with the one 16, except when said latter clutch members are held apart by the automatic release of my invention, to be now described.

The clutch members 16, 22 are provided on their opposed surfaces with means which, the moment the screw or nut becomes set or tightened to the proper tension, will act to automatically move the clutch member 22 outward against its spring 28 a distance sufficient to completely disengage and separate the teeth 26, 27 of said members and positively hold the clutch members apart for substantially a complete revolution of the spindle 4 and immediately repeat the operation so that no opportunity is afforded for said teeth to slip or ratchet over each other to wear or break on releasing the shaft 12 from the spindle 4. The means referred to may take the form of coacting arcuate slots and projections on the respective clutch members arranged within the line of their teeth, as shown in Figs. 5 and 6.

As there shown, the teeth 26, 27 of the clutch members 16 and 22 do not extend clear across their opposed faces but are confined to their outer peripheries. This leaves the opposed surfaces of the members inside of the teeth flat except for the grooves and projections to be now described. The clutch member 16 is provided in this flat surface with two arcuate grooves 35, 36. These grooves are diametrically or oppositely disposed and are milled in the member 16 with the groove 35 just inside the row of teeth 27 and with the groove 36 at or close to the center hole or bore in the member through which the shaft 12 extends. Both grooves are cut on the same degree, and the inner groove 36, which is nearer the center, is shorter than the outer groove 35. The grooves 35, 36 are concentrically arranged with respect to the axial center of the member 16 but, being out of circumferential alignment, provide different trackways 37, 38 on the face of the member 16 for the arcuate projections 39, 40 on the other clutch member 22.

The projections 39, 40 are disposed on the face of the member 22 in the same relative positions as the grooves and, having the same shape as the grooves and being slightly shorter, enter the grooves when the clutch members 16, 22 go together for their teeth to engage, as shown in Fig. 3. The projections 39, 40 project outward from the member 22 a distance slightly greater than the total lift required to clear the teeth of the clutch members, and the grooves 35, 36 are made deep enough to fully receive the projections when said clutch members are engaged. The projections 39, 40 should necessarily be a little shorter than the grooves in order not to interfere when the clutch members 16, 22 snap together when the grooves and projections register.

At least one end of each groove 35, 36 is slightly beveled or inclined, as at 41 in Figs. 5 and 9, and the corresponding ends of the projections are also similarly inclined, as at 42 in Figs. 6 and 9. This is provided so that when the projections 39, 40 are forced against the ends of the grooves, as when the clutch member 16 is turned by the spindle 4 with respect to the clutch member 22, the inclines 41, 42 will cause the projections to ride out of the grooves onto the trackways 37, 38 and move the clutch member 22 from the one 16 for completely separating the teeth of said members. As the grooves 35, 36 are in the different trackways 37, 38, the clutch members 16, 22 are held apart for approximately one full revolution of the clutch member 16, because the projections 39, 40 can not enter their grooves until after they have traveled around their respective tracks for one revolution. When this occurs, the projections enter the grooves and the teeth 26, 27 engage. If the tool is still pressed against the work, the projections will immediately ride out of the grooves and the teeth will again be separated and be held apart for another revolution and the action repeated until the tool is withdrawn. By this action the teeth 26, 27 would only momentarily engage once in each revolution, and thus can not ratchet or slide over each other to wear or break, as heretofore.

A sleeve 43 is attached to the outer end of the extension 3 and projects beyond the same and forms a protecting housing or guard about all of the clutches of the device. The lower end of the sleeve is turned inward to provide a circular flange 44, which projects over the clutch member 22 and limits the outward movement thereof by the spring 33.

A socket 45 is shown secured to the outer end of the shaft 12 to fit over a nut, as 46, to be set or tightened by the tool. For driving screws, a suitable holder for a screw driving bit will be applied to the shaft 12 in place of the socket 45. Sockets 45 of different sizes will be used for the different sizes and shapes of nuts to be operated on, and the same is true with respect to the driving bits for the different sizes of screws.

In operation, the operator grasps and holds the tool by its handles, turning on the current to the motor of the tool through a suitable switch to set the tool in operation, and then applies the socket 45 over the nut 46 to be set. The main clutch members 13, 16 are at this time disengaged or separated (by spring 33) and the supplemental clutch members 16, 22 have their teeth engaged, if the projections 39, 40 are in the grooves 35, 36. (See Fig. 2.) The clutch member 22 is held against the flange 44 by the spring 33, and the shaft 12, socket 45, and clutch members 16 and 22 are not rotated by the rotating spindle 4 at this time. The operator now forces or presses the tool against the work, thereby closing up the clutch members 13, 16 and connecting the shaft 12 to the rapidly rotating spindle 4, the projections 39, 40 quickly entering the grooves 35, 36 (if not already there) so that the teeth of all of the clutches will be engaged to turn the shaft by the spindle. In pressing the tool against the work, the flanged end 44 of the guard or sleeve 43 is moved forward out of contact with the clutch member 22 (Fig. 4), so that the latter may yield against its spring 28 when the projections 39, 40 ride out of the grooves to separate the teeth of the clutch members 16, 22. This takes place the moment the nut becomes set to the proper tension. The tightened nut resists further turning of the shaft 12 and the clutch member 22, and as a result the clutch member 16 continues to rotate with the spindle 4. The teeth 26 of the member 16 begin to slide over those (27) of the member 22 and force the latter outward against the spring 28. Up to this point the automatic release has been inactive, as the projections 39, 40 are still in the grooves 35, 36. By the time the inclined faces of the teeth 26, 27 have cleared and the outer ends of the teeth are resting on one another, the beveled ends 41 of the grooves 35, 36 have been moved into contact with the beveled ends 42 of the projections 39, 40 and the member 22 is forced farther outward from the member 16 to lift the teeth completely out of contact and completely release the shaft from the spindle. The teeth are held out of contact for one full revolution of the spindle minus the play between the width of the teeth. When the spindle about completes this revolution and the teeth pass over each other the last time and before the teeth on member 16 have quite reached the space between the teeth on member 22, the projections 39, 40 drop into the grooves 35, 36 and the teeth of the members will come together. There is a little space or clearance between these teeth (Fig. 2) in order to give time for the clutches to close. The tool may be withdrawn from the work before this revolution is complete. If not, the teeth momentarily engage and are again separated by the projections riding out of the grooves and on to the trackways 37, 38.

With the bevel or taper at only one end of each projection and groove, the other end is left square and a positive hold is provided between the projections and grooves for unscrewing screws and nuts by the tool when the rotation of the spindle is reversed, as may be done with reversible tools. When the device is made to set both right and left-handed screws and nuts, both ends of the grooves and projections will be beveled.

The projections 39, 40 may be made integral with the clutch member 22, or they may be made independent of said member and afterward secured thereto as shown in Figs. 6 and 8. As there illustrated, an annular recess 47 is turned in the face of the member 22 between its teeth and its bore. On a ring 48 which is set in this recess are made the projections 39, 40. The ring is secured in the recess in any suitable manner, rivets 49, 49 being shown for the purpose in Fig. 8.

With the teeth 26, 27 of the clutch members 16 and 22 completely separated and held apart when said clutch members are disengaged, the drive through these clutch members will be interrupted, and no torque strains will be transmitted through the clutch device by reason of the rotation of the clutch member 16 with the clutch member 13, should the last two clutch members be engaged at that time. The bevels or inclines for the teeth of the members of the clutch device and for the ends of the grooves and the projections of the supplemental clutch members 16 and 22 are such that the supplemental clutch members will disengage under a torque strain less than what would be required to disengage the teeth 14 and 17 of the main clutch, which includes the clutch member 13 and the member 16 of the supplemental clutch. The three clutch members 13, 16 and 22 are axially aligned and form the innermost, intermediate and outermost members respectively of the clutch assembly. The intermediate member 16 cooperates with the innermost and the outermost members 13 and 22 and forms therewith main and supplemental clutches, respectively. The main clutch is the driving clutch while the supplemental clutch automatically releases the shaft from the positive drive of the spindle on the development of a predetermined torsional stress between the members of the supplemental clutch through the tightening of the screw or nut without requiring a release of the main clutch. This allows the continued rotation of the main clutch to effect an automatic re-engagement of the teeth of the supplemental clutch as soon as the members thereof reach their single position of rotative engagement. This automatically sets the clutch assembly for a driving operation without being required to stop the rotation to engage the clutch members.

The details of structure and arrangement of parts shown and described may be variously changed and modified without departing from the spirit and scope of my invention.

I claim as my invention:

1. In a clutch, a pair of axially alined clutch members having interengageable clutch teeth on their opposed faces, said members having opposed grooves and projections adapted, when the projections are in the grooves, to permit the teeth of the clutch members to engage, and, when the projections ride out of the grooves, to separate said teeth, said grooves and projections being arranged in two concentric tracks of different radii and each track preferably having but one groove or projection therein.

2. In a clutch, a pair of axially alined clutch members having interengageable clutch teeth on their opposed faces with the teeth arranged in ring form about the axis of the members and spaced radially outward therefrom, and co-acting means on the opposed faces of the members in offset relation to said ring of teeth to permit interengagement of all of the teeth in a single rotative position only of said members and operable upon the development of a predetermined torsional stress between them to automatically separate said members and hold their teeth out of positive driving engagement for substantially a full rotation of one member with respect to the other.

3. As an article of manufacture, a clutch member having a circular body portion provided with a ring of clutch teeth about the outer periphery thereof, and oppositely disposed arcuate projections on the clutch member within the ring of teeth, said projections extending outward from the clutch member to a greater extent than the teeth.

4. As an article of manufacture, a clutch member having a circular body portion provided with a ring of teeth about its outer periphery, oppositely disposed arcuate projections on said clutch member within said ring of teeth, said projections extending outward from the clutch member to a greater extent than the teeth with one projection circumferentially shorter than the other and nearer the center of the body portion than the other projection.

5. As an article of manufacture, a clutch member having a circular body portion with a ring of clutch teeth about its outer periphery, and arcuate grooves formed in the clutch member within said ring of teeth, said grooves being oppositely disposed and of different circumferential length and arranged one nearer the center of the body portion than the other.

6. In a clutch, separable clutch members having a plurality of teeth all of which interengage when driving one member by the other, said members being constructed to permit interengagement of all of the teeth thereof in a single rotative position only of the members and operable upon the development of a predetermined torsional stress between them to automatically separate the members and maintain their teeth out of positive driving engagement for substantially a full revolution of one member with respect to the other, and means acting through the continued rotation of the rotating member for effecting the automatic reengagement of all of the teeth of said members as soon as the latter reaches said single position of rotative engagement.

7. In a clutch, separable clutch members having a plurality of teeth all of which interengage when driving one member by the other, said members being constructed to permit interengagement of all of the teeth thereof in a single rotative position only of said members and operable upon the development of a predetermined torsional stress between them to automatically separate the members and maintain their teeth out of positive driving engagement for substantially a full revolution of one member with respect to the other, and means acting through the continued rotation of the rotating member for effecting the automatic reengagement of all of the teeth of said members as soon as the latter reaches said single position of rotative engagement, said means being adjustable for determining said torsional stress.

In testimony whereof I affix my signature.

AXEL LEVEDAHL.